United States Patent
Chen et al.

(10) Patent No.: US 10,131,775 B2
(45) Date of Patent: *Nov. 20, 2018

(54) POLYOLEFIN/(METH)ACRYLIC IMPACT MODIFIER AND METHOD OF PREPARING SAME

(71) Applicants: Dow Global Technologies LLC, Midland, MI (US); Rohm and Haas Company, Philadelphia, PA (US)

(72) Inventors: Liang Chen, Midland, MI (US); Yannick Saint-Gerard, Roqueford les Pins (FR); Veera Nelliappan, North Wales, PA (US); Vithya A. Abdul-Rahiman, Cagnes sur Mer (FR)

(73) Assignee: Rohm and Haas Company, Collegeville, PA (US)

(*) Notice: Subject to any disclaimer, the term of this patent is extended or adjusted under 35 U.S.C. 154(b) by 94 days.

This patent is subject to a terminal disclaimer.

(21) Appl. No.: 14/902,580

(22) PCT Filed: Jun. 30, 2014

(86) PCT No.: PCT/US2014/044803
§ 371 (c)(1),
(2) Date: Jan. 3, 2016

(87) PCT Pub. No.: WO2015/002859
PCT Pub. Date: Jan. 8, 2015

(65) Prior Publication Data
US 2016/0168368 A1    Jun. 16, 2016

Related U.S. Application Data

(60) Provisional application No. 61/841,957, filed on Jul. 2, 2013.

(51) Int. Cl.
| | |
|---|---|
| *C08F 255/02* | (2006.01) |
| *C08L 23/08* | (2006.01) |
| *C08L 23/26* | (2006.01) |
| *C08L 69/00* | (2006.01) |

(52) U.S. Cl.
CPC ........ *C08L 23/0815* (2013.01); *C08F 255/02* (2013.01); *C08L 23/26* (2013.01); *C08L 69/00* (2013.01); *C08L 2205/02* (2013.01); *C08L 2205/03* (2013.01); *C08L 2205/035* (2013.01); *C08L 2207/53* (2013.01)

(58) Field of Classification Search
CPC .. C08L 23/0815; C08L 69/00; C08L 2205/02; C08L 2205/03; C08L 2205/035; C08L 2207/53; C08F 255/02
See application file for complete search history.

(56) References Cited

U.S. PATENT DOCUMENTS

| | | |
|---|---|---|
| 3,645,992 A | 2/1972 | Elston |
| 4,076,698 A | 2/1978 | Anderson et al. |
| 4,599,392 A | 7/1986 | McKinney et al. |
| 4,988,781 A | 1/1991 | McKinney et al. |
| 4,997,884 A | 3/1991 | Ilenda et al. |
| 5,272,236 A | 12/1993 | Lai et al. |
| 5,278,272 A | 1/1994 | Lai et al. |
| 5,504,172 A | 4/1996 | Imuta et al. |
| 5,938,437 A | 8/1999 | DeVinenzo |
| 9,598,569 B2* | 3/2017 | Nelliappan ............ C08F 255/02 |
| 2002/0198326 A1* | 12/2002 | Aoyama et al. ........ C08L 27/12 525/199 |
| 2006/0199930 A1 | 9/2006 | Li Pi Shan et al. |
| 2013/0059165 A1* | 3/2013 | Malotky et al. ........ C08L 51/00 428/523 |
| 2014/0255683 A1* | 9/2014 | Amici et al. ......... C09D 123/08 428/327 |

FOREIGN PATENT DOCUMENTS

| | | |
|---|---|---|
| EP | 0575040 | 12/1993 |
| EP | 0679684 | 5/1995 |
| JP | 2000264933 | 9/2000 |
| WO | WO 00/101745 | 1/2000 |
| WO | WO2005/090427 | 9/2005 |
| WO | WO2015/002858 | 1/2015 |

OTHER PUBLICATIONS

EP Response to Office Action dated Jun. 8, 2016; from EP counterpart Application No. 14 748 005.7.
EP Office Action dated Oct. 17, 2016; from EP counterpart Application No. 14748005.7.
Chinese Office Action dated Apr. 26, 2017; from Chinese counterpart Application No. 201480035240.3.
EP Office Action dated Jun. 3, 2017; from EP counterpart Application No. 14748005.7.
PCT Search Report dated Jan. 27, 2015; from PCT counterpart Application No. PCT/US2014/044803.

(Continued)

*Primary Examiner* — Nathan M Nutter (57) ABSTRACT

A composite polymer composition comprising: the emulsion polymerization product of: (i) an aqueous polyolefin dispersion comprising the melt kneading product of one or more polyolefins, from 2 to 25 wt % of one or more dispersion stabilizing agents and water, and (ii) one or more (meth) acrylic monomers; wherein the one or more polyolefins have a Tg equal to or less than 50° C.; and wherein the melt kneading product (i) comprises polymer particles having a volume average particle size between 150 nm and 2000 nm dispersed in the water; and wherein the one or more (meth) acrylic monomers polymerize onto the polymer particles form composite polymer particles is provided. Also provided is a method of making the composition and impact modifiers comprising the composition.

9 Claims, 2 Drawing Sheets

(56) References Cited

OTHER PUBLICATIONS

PCT IPRP Report dated Jan. 5, 2016; from PCT counterpart Application No. PCT/US2014/044803.
Chinese Office Action dated Jan. 8, 2018; from Chinese counterpart Application No. 201480035240.3.
Japanese Office Action dated Mar. 23, 2018; from Japanese counterpart Application No. 2016-524282.
EP Action dated Jul. 27, 2018; from counterpart EP Application No. 14748005.7.
Chinese Action dated Jul. 27, 2018; from counterpart Chinese Application No. 201480035240.3.

\* cited by examiner

POLYOLEFIN/(METH)ACRYLIC IMPACT MODIFIER AND METHOD OF PREPARING SAME

FIELD OF INVENTION

The instant invention relates to a polyolefin/(meth)acrylic impact modifier and methods of preparing the same.

BACKGROUND OF THE INVENTION

Certain resins used for a variety of end use applications, such as polycarbonate, show good impact properties at room temperature but the impact properties deteriorate at lower temperature. Use of impact modifiers helps preserve the impact properties at lower temperatures.

For certain applications such as impact modification of window profiles (particularly in colder climates), there are strong market needs to improve properties such as low temperature impact resistance which does not deteriorate with weathering.

Typically impact modifiers are prepared by emulsion polymerization process and are comprised of up to 95% of a low glass transition temperature (Tg) core, and a high Tg shell, composed primarily of polymethylmethacrylate (PMMA). The PMMA shell prevents the low Tg core from agglomeration when it is isolated from the latex phase. Additionally, the PMMA shell aids in compatibilizing the core with the matrix material. Without the PMMA shell, the effectiveness of the impact modifiers is limited.

For compositions that are prepared with polybutadiene core, the weatherability is typically poor, as the residual unsaturation crosslinks and gets embrittled.

The particle size at which impact modification is most effective is in the range of 50 to 500 nm. Particles of this size are typically made by emulsion polymerization.

Thus far, the chemistries that were available to prepare impact modifiers were limited to the monomers that could be emulsion polymerized. It has not previously been possible to use other chemistries such as olefinic, (which can be effective in impact modification because of good weatherability and low Tg) as no route existed to make small particles with a multi layer structure (for example, core/shell structure).

Currently, functionalized polyolefin pellets have been used directly to compound into another matrix resin, by tuning process parameters, a discrete polyolefin phase can be achieved. However, it is quite challenging to get desired compatibility (limited resin functionality) and particle size and for each specific resin, the process conditions have to be optimized. Additionally it has not been possible to add a shell layer (such as PMMA) to help in compatibilization and stress transfer. To date, there is no olefin powder similar to the acrylic impact modifier with a core-shell structure, where the shell offers good compatibility and the rubber core imparts the impact strength. Typically, aggregated discrete particles (100-500 nm) can be facilely dispersed in a matrix resin. We hypothesize that if the acrylic core is replaced by an olefin elastomer, with the same acrylic shell, such products can be a drop-in replacement for the incumbent acrylic or butadiene based impact modifiers in many systems and in addition it is expected that they bring good performance attributes from polyolefin (e.g. weatherability, and low temperature toughening). To date, there has been no technology available to make such products.

SUMMARY OF THE INVENTION

The instant invention is a polyolefin/(meth)acrylic impact modifier and method of preparing the same.

In one embodiment, the instant invention provides a composite polymer composition comprising: the emulsion polymerization product of: (i) an aqueous polyolefin dispersion comprising the melt kneading product of one or more polyolefins, from 2 to 25 wt % of one or more dispersion stabilizing agents, water and optionally a neutralizing agent, and (ii) one or more (meth)acrylic monomers; wherein the one or more polyolefins have a Tg equal to or less than 50° C.; and wherein the melt kneading product (i) comprises polymer particles having a volume average particle size from 150 nm to 2000 nm dispersed in the water; and wherein the one or more (meth)acrylic monomers polymerize onto the polymer particles to form composite polymer particles.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

The instant invention is a polyolefin/(meth)acrylic impact modifier and method of preparing the same.

The composite polymer composition according to the present invention comprises: the emulsion polymerization product of: (i) an aqueous polyolefin dispersion comprising the melt kneading product of one or more polyolefins, from 2 to 25 wt % of one or more dispersion stabilizing agents and water, and (ii) one or more (meth)acrylic monomers; wherein the one or more polyolefins have a Tg equal to or less than 50° C.; and wherein the melt kneading product (i) comprises polymer particles having a volume average particle size from 150 nm to 2000 nm dispersed in the water; and wherein the one or more (meth)acrylic monomers polymerize onto the polymer particles to form composite polymer particles.

In another alternative embodiment, the instant invention further provides an impact modifier composition comprising: a spray dried product of the composite polymer composition according to any of the embodiments disclosed herein.

In another alternative embodiment, the instant invention further provides an impact modified resin comprising a matrix polymer resin; and the impact modifier composition according to any of the embodiments disclosed herein.

In another alternative embodiment, the instant invention further provides a method for forming an impact modifier composition comprising: melt kneading one or more polyolefins, less than or equal to one or more dispersion stabilizing agents and water, wherein the one or more polyolefins have a Tg of equal to or less than 50° C.; adding to the melt kneading product one or more (meth)acrylic monomers under emulsion polymerization conditions to form a composite polymer composition; and isolating the composite polymer particles by removing water from the emulsion wherein the isolation process is selected from the group consisting of spray drying and fluid bed drying, Aqueous Polyolefin Dispersion Polyolefin The aqueous dispersion comprises from 5 to 99 percent by weight of one or more polyolefins, based on the total weight of the solid content of the aqueous dispersion. All individual values and subranges from 5 to 99 weight percent are included herein and disclosed herein; for example, the weight percent can be from a lower limit of 5, 8, 10, 15, 20, 25 weight percent to an upper limit of 40, 50, 60, 70, 80, 90, 95, or 99 weight percent. For example, the aqueous dispersion may comprise from 15 to 99, or from 15 to 90, or 15 to 80, or from 15 to 75, or from 30 to 70, or from 35 to 65 percent by weight of one or more polyolefins, based on the total weight of the solid content of the aqueous dispersion. The aqueous dispersion comprises at least one or more polyolefins.

The polyolefins used in the invention have Tg less than or equal to 50° C. All individual values and subranges equal to or less than 50° C. are disclosed herein and included herein. For example, the Tg may be equal to or less than 50° C., or in the alternative, the Tg may be equal to or less than 40° C., or in the alternative, the Tg may be equal to or less than 30° C., or in the alternative, the Tg may be equal to or less than 15° C., or in the alternative, the Tg may be equal to or less than 0° C., or in the alternative, the Tg may be equal to or less than −15° C. In one embodiment, the polyolefins have a Tg equal to or less than −50° C.

Examples of polyolefins include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer. These resins may be used either alone or in combinations of two or more.

In selected embodiments, base polymer may, for example, comprise one or more polyolefins selected from the group consisting of ethylene-alpha olefin copolymers, propylene-alpha olefin copolymers, and olefin block copolymers. In particular, in select embodiments, the base polymer may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers as described in U.S. Pat. No. 3,645,992; high density polyethylene (HDPE), as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA).

In other particular embodiments, the base polymer may, for example, be ethylene vinyl acetate (EVA) based polymers. In other embodiments, the base polymer may, for example, be ethylene-methyl acrylate (EMA) based polymers. In other particular embodiments, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In one particular embodiment, the polyolefin is a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The olefin copolymer may have a melt flow rate in the range of from 1 to 1500 g/10 minutes, measured in accordance with ASTM D-1238 (at 190° C./2.16 Kg). All individual values and subranges from 1 to 1500 g/10 minutes are included herein and disclosed herein; for example, the melt flow rate can be from a lower limit of 1 g/10 minutes, 2 g/10 minutes, 3 g/10 minutes, 4 g/10 minutes, 5 g/10 minutes 100 g/10 minutes, 200 g/10 minutes, 500 g/10 minutes, 800 g/10 minutes, 1000 g/10 minutes, 1300 g/10 minutes; or 1400 g/10 minutes to an upper limit of 1500 g/10 minutes, 1250 g/10 minutes, 1000 g/10 minutes, 800 g/10 minutes, 500 g/10 minutes, 100 g/10 minutes, 50 g/10 minutes, 40 g/10 minutes, and 30 g/10 minutes. For example, the propylene/alpha-olefin copolymer may have a melt flow rate in the range of from 1 to 1500 g/10 minutes; or from 1 to 500 g/10 minutes; or from 500 to 1500 g/10 minutes; or from 500 to 1250 g/10 minutes; or from 300 to 1300 g/10 minutes; or from 5 to 30 g/10 minutes.

The olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such olefin copolymers are commercially available from The Dow Chemical Company, under the tradename VER- SIFY™ and ENGAGE™, or from ExxonMobil Chemical Company, under the tradename VISTAMAXX™ and EXACT™.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers, may be used as the polyolefin. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48°\text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

In certain embodiments, the polyolefin may, for example, comprise one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary base polymers include, but are not limited to, ethylene ethyl acrylate (EEA) copolymer, ethylene methyl methacrylate (EMMA), and ethylene butyl acrylate (EBA).

In one embodiment, the polar polyolefin may be selected from the group consisting of ethylene-acrylic acid (EAA) copolymer, ethylene-methacrylic acid copolymer, and combinations thereof, and the stabilizing agent may, for example, comprise a polar polyolefin selected from the group consisting of ethylene-acrylic acid (EAA) copolymer, ethylene-methacrylic acid copolymer, and combinations thereof; provided, however, that base polymer may, for example, have a lower acid number, measured according to ASTM D-974, than the stabilizing agent.

Stabilizing Agent

The aqueous dispersion further comprises at least one or more stabilizing agents, also referred to herein as dispersion agents, to promote the formation of a stable dispersion. The stabilizing agent may preferably be an external stabilizing agent. The aqueous dispersion comprises 2 to 25 percent by weight of one or more stabilizing agents, based on the total weight of the solid content of the dispersion. All individual values and subranges from 2 to 25 weight percent are included herein and disclosed herein; for example, the weight percent can be from a lower limit of 2, 5, 7, 9, 11, 14, 19 or 24 weight percent to an upper limit of 4, 6, 8 10, 15, 20 or 25 weight percent. For example, the dispersion may comprise from 2 to 25, or in the alternative from 1 to 5, or in the alternative from 3 to 10, or in the alternative from 2 to 8 percent, or in the alternative from 5 to 20 percent, or in the alternative from 10 to 20 percent by weight of one or more stabilizing agents, based on the total weight of the solid content of the dispersion. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR, commercially available from The Dow Chemical Company, NUCREL, commercially available from E.I. DuPont de Nemours, and ESCOR, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may optionally be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl) ethylenediamine, 1.2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the polyolefin during dispersion preparation. Examples of external surfactants useful herein include, but are not limited to, salts of dodecyl benzene sulfonic acid and lauryl sulfonic acid salt. Internal surfactants are surfactants that do become chemically reacted into the polyolefin during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-455, TRITON H-55, TRITON GR-5M, TRITON BG-10, and TRITON CG-110, each available from The Dow Chemical Company, Midland, Mich.

Fluid Medium

The dispersion further comprises a fluid medium. The fluid medium may be any medium; for example, the fluid medium may be water. The dispersion of the instant invention comprises 35 to 80 percent by volume of fluid medium, based on the total volume of the dispersion. In particular embodiments, the water content may be in the range of from 35 to 75, or in the alternative from 35 to 70, or in the alternative from 45 to 60 percent by volume, based on the total volume of the dispersion. Water content of the dispersion may preferably be controlled so that the solids content (polyolefin plus stabilizing agent) is between about 1 percent to about 74 percent by volume. In particular embodiments, the solids range may be between about 10 percent to about 70 percent by volume. In other particular embodiments, the solids range is between about 20 percent to about 65 percent by volume. In certain other embodiments, the solids range is between about 25 percent to about 55 percent by volume.

Additional Components

In some embodiments, the aqueous dispersion may further comprise optionally one or more binder compositions such as acrylic latex, vinyl acrylic latex, styrene acrylic latex, vinyl acetate ethylene latex, and combinations thereof; optionally one or more fillers; optionally one or more additives; optionally one or more pigments, e.g. titanium dioxide, mica, calcium carbonate, silica, zinc oxide, milled glass, aluminum trihydrate, talc, antimony trioxide, fly ash, and clay; optionally one or more co-solvents, e.g. glycols, glycol ether, 2,2,4-trimethyl-1,3-pentanediol monoisobutyrate, alcohols, mineral spirits, and benzoate esters; optionally one or more dispersants, e.g. aminoalcohols, and polycarboxylates; optionally one or more surfactants; optionally one or more defoamers; optionally one or more preservatives, e.g. biocides, mildewcides, fungicides, algaecides, and combinations thereof; optionally one or more thickeners, e.g. cellulosic based thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or optionally one or more additional neutralizing agents, e.g. hydroxides, amines, ammonia, and carbonates.

Forming the Aqueous Dispersion

The aqueous dispersion can be formed by any number of methods recognized by those having skill in the art. In one embodiment, one or more polyolefin, one or more subparticles, and optionally one or more stabilizing agents are melt-kneaded in an extruder along with water and a neutralizing agent, such as ammonia, potassium hydroxide, or a combination of the two to form a dispersion. In another embodiment, one or more polyolefins and one or more subparticles are compounded, and then the polyolefin/subparticles compound is melt-kneaded in an extruder in the presence of an optional stabilizing agent, water, and one or more neutralizing agents thereby forming a dispersion. In some embodiments, the dispersion is first diluted to contain about 1 to about 3% by weight water and then, subsequently, further diluted to comprise greater than about 25% by weight water.

Any melt-kneading means known in the art may be used. In some embodiments, a kneader, a BANBURY® mixer, single-screw extruder, or a multi-screw extruder, e.g. a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used, but in some embodiments, for example, a pump that provides a flow of about 150 cc/min at a pressure of 240 bar is used to provide the base and the initial water to the extruder. In other embodiments, a liquid injection pump provides a flow of 300 cc/min at 200 bar or 600 cc/min at 133 bar. In some embodiments, the base and initial water are preheated in a preheater.

One or more polyolefins, in the form of pellets, powder, or flakes, are fed from the feeder to an inlet of the extruder where the resin is melted or compounded. One or more subparticles may be fed simultaneously with one or more polyolefins into the extruder via the feeder; or in the alternative, one or more subparticles may be compounded into one or more polyolefins, and then fed into the extruder via the feeder. In the alternative, additional one or more subparticles may further be metered via an inlet prior to the emulsification zone into the molten compound comprising one or more polyolefins and optionally one or more subparticles. In some embodiments, the dispersing agent is added to one or more polyolefins through and along with the resin and in other embodiments, the dispersing agent is provided separately to the twin screw extruder. The resin melt is then delivered from the mix and convey zone to an emulsification zone of the extruder where the initial amount of water and base from the water and base reservoirs are added through an inlet. In some embodiments, dispersing agent may be added additionally or exclusively to the water stream. In some embodiments, further dilution water may be added via water inlet from water reservoir in a dilution and cooling zone of the extruder. Typically, the dispersion is diluted to at least 30 weight percent water in the cooling zone. In addition, the diluted mixture may be diluted any number of times until the desired dilution level is achieved. In some embodiments, water is not added into the twin screw extruder but rather to a stream containing the resin melt after the melt has exited from the extruder. In this manner, steam pressure build-up in the extruder is eliminated and the dispersion is formed in a secondary mixing device such as a rotor stator mixer.

The melt kneading product comprises polymer particles having a volume average particle size from 150 nm to 2000 nm dispersed in the water. All values and subranges from 150 nm to 2000 nm are included herein and disclosed herein; for example the particle size may range from a lower limit of 150, 350, 550, 750, 950, 1150, 1350, 1550, 1750 or 1950 nm to an upper limit of 200, 400, 600, 800, 1000, 1200, 1400, 1600, 1800 or 2000 nm.

(Meth)Acrylic Monomers

As used herein, the term "(meth)acrylic" means acrylic or methacrylic.

(Meth)acrylic monomers used herein include, by way of example, C1-C18 (meth)acrylates, such as, butyl acrylate, ethylacrylate, 2-ethyl hexyl acrylate, propyl acrylate, methyl acrylate, hexyl acrylate, butylmethacrylate, methylmethacrylate, ethylhexyl methacrylate, stearyl acrylate, benzyl acrylate, cyclohexyl methacrylate, isobornyl methacrylate, tetrahydrofurfuryl methacrylate, cyclopentyl methacrylate, trifluoroethylmethacrylate, hydroxyethylmethacrylate and dicyclopentadienyl methacrylate and blends thereof, and combinations thereof.

The (meth)acrylic monomers may be functionalized, non-functionalized or a combination thereof.

Exemplary functionalized (meth)acrylic monomers include but not limited to, acrylic acid, methacrylic acid, glycidyl methacrylate, allyl methacrylate, hydroxyethyl methacrylate, and acrylamide.

Emulsion Polymerization

Emulsion polymerization conditions are well known in the art. Emulsion polymerization processes typically utilize one or more surfactants. Optionally, exemplary surfactant includes, for example, sodium dodecyl benzene sulfonate surfactant One or more crosslinking and/or graft-linking agents may optionally be added to the emulsion polymerization. Exemplary crosslinking agents include, for example, divinylbenzene; vinyl group-containing monomers including; triallyl (iso)cyanurate, and triallyl trimellitate; (poly)alkylene glycol di(meth)acrylate compounds including ethylene glycol dimethacrylate (EGDMA), diethylene glycol dimethacrylate, 1, 6-hexanediol di(meth)acrylate, (poly)ethylene glycol di(meth)acrylate, (poly)propylene glycol di(meth)acrylate, (poly)tetramethylene glycol di(meth)acrylate, pentaerythritol tetra(meth)acrylate, pentaerythritol tri(meth)acrylate, pentaerythritol di(meth)acrylate, trimethylolpropane tri (meth)acrylate, dipentaerythritol hexa(meth)acrylate, dipentaerythritol penta(meth)acrylate, and glycerol tri(meth)acrylate and mixtures and combination thereof.

Exemplary graft-linking agents include, for example, allyl methacrylate, diallyl maleate and allyl acryloxypropionate.

In an alternative embodiment, the instant invention provides a composite polymer composition, impact modifier, impact modified resin, and method of making an impact modifier, in accordance with any of the embodiments disclosed herein, except that the one or more polyolefins are selected from the group consisting of ethylene homopolymers, ethylene/α-olefin copolymers, ethylene/α-olefin multiblock interpolymers, propylene homopolymers, propylene/α-olefin copolymers and propylene/α-olefin multiblock interpolymers.

In an alternative embodiment, the instant invention provides a composite polymer composition, impact modifier, impact modified resin, and method of making an impact modifier, in accordance with any of the embodiments disclosed herein, except that the one or more (meth)acrylic monomers are selected from the group consisting of functionalized and nonfunctionalized (meth)acrylic monomers.

In an alternative embodiment, the instant invention provides a core/shell polymer composition, impact modifier, impact modified resin, and method of making an impact modifier, in accordance with any of the embodiments disclosed herein, except that the one or more vinyl monomers selected from the group consisting of alkyl/aryl (meth) acrylates, functionalized alkyl(meth)acrylates styrene, acrylonitrile, butadiene, chloroprene, vinyl chloride, (meth)acrylates, vinyl acetate, and combinations of two or more thereof.

In an alternative embodiment, the instant invention provides a core/shell polymer composition, impact modifier, impact modified resin, and method of making an impact modifier, in accordance with any of the embodiments disclosed herein, except that the emulsion polymerization is carried out in the presence of one or more crosslinking and/or graftlinking agents.

In an alternative embodiment, the instant invention provides an impact modified resin according to any of the embodiments disclosed herein except that the matrix polymer resin is selected from the group consisting of polycarbonate (PC) and PC blends, polyesters (such as, polybutylene terephthalate/polyethylene terephthalate (PBT/PET) and polylactic acid), polystyrene (PS), styrenic copolymers (such as, acrylonitrile butadiene styrenes (ABS)), polyvinylchloride (PVC), polyamides (PA) (such as, polyamide 6 and polyamide 66) and acetal resins. (such as, POM copolymer).

Composite Polymer Particles

In one embodiment, the composite polymer particles exhibit a core/shell structure.

In an alternative embodiment, the composite polymer particles have a core/shell structure wherein the core comprises polyolefin.

In yet another alternative embodiment, the composite polymer particles have a core/shell structure wherein the (meth)acrylic mononomers polymerize onto the polyolefin to form at least a partial shell around the polyolefin core.

In some embodiments, the composite polymer particles may contain from 50 to 95 wt % units derived from olefin and from 5 to 50 wt % units derived from (meth)acrylic. All individual values and subranges from 50 to 95 wt % are included herein and disclosed herein; for example, the units derived from olefin may be from an upper limit of 55, 60, 65, 70, 75, 80, 85, 90 or 95 wt % to a lower limit of 50, 55, 60, 65, 70, 75, 80, 85, or 90 wt %. For example, the units derived from olefin may range from 50 to 95 wt %, or in the alternative, the units derived from olefin may range from 60 to 95 wt %, or in the alternative, the units derived from olefin may range from 70 to 90 wt %, or in the alternative, the units derived from olefin may range from 85 to 95 wt %, or in the alternative, the units derived from olefin may range from 65 to 85 wt %. All individual values and subranges from 5 to 50 wt % are included herein and disclosed herein; for example, the units derived from (meth)acrylic may range from an upper limit of 10, 15, 20, 25, 30, 35, 40, 45 or 50 wt % to a lower limit of 5, 10, 15, 20, 25, 30, 35, 40, or 45 wt %. For example, the units derived from (meth)acrylic may range from 5 to 50 wt %, or in the alternative, the units derived from (meth)acrylic may range from 10 to 50 wt %, or in the alternative, the units derived from (meth)acrylic may range from 5 to 40 wt %, or in the alternative, the units derived from (meth)acrylic may range from 5 to 30 wt %, or in the alternative, the units derived from (meth)acrylic may range from 15 to 35 wt %.

In some embodiments of the composite particles, the meth(acrylic) component is partially crosslinked.

In some embodiments of the composite particles, the (meth)acrylic component has a Tg of at least 50° C. All individual values and subranges from at least 50° C. are included herein and disclosed herein. For example, the Tg of the (meth)acrylic component may be from at least 50° C., or in the alternative, the Tg of the (meth)acrylic component may be from at least 50° C., or in the alternative, the Tg of the (meth)acrylic component may be from at least 60° C., or in the alternative, the Tg of the (meth)acrylic component may be from at least 70° C., or in the alternative, the Tg of the (meth)acrylic component may be from at least 80° C. In another embodiment, the (meth)acrylic component has a Tg less than or equal to 120° C. The meth(acrylic) phase is preferably partially crosslinked.

Examples

The following examples illustrate the present invention but are not intended to limit the scope of the invention.

An aqueous polyolefin dispersion was prepared utilizing a KWP (Krupp Werner & Pfleiderer Corp. (Ramsey, N.J.) ZSK25 extruder (25 mm screw diameter, 60 L/D rotating at 450 rpm) according to the following procedure. The base polyolefin resin (an ethylene-octene copolymer), such as ENGAGE™ 8200 from Dow Chemical (density=0.87 g/cm3, melt flow index=5 (190° C./2.16 kg), Glass transition temperature (Tg)=−53° C.) and maleated polyethylene (such as LICOCENE PE MA 4351 from Clariant (Muttenz, Switzerland) were supplied to the feed throat of the extruder via a Schenck Mechatron loss-in-weight feeder and a Schenck volumetric feeder, respectively. The polymers were then melt blended, and then emulsified in the presence of initial aqueous stream and a lauryl ether (2EO) sulfate (EMPICOL ESB 70 from Huntsman) at high pressure. The emulsion phase was then conveyed forward to the dilution and cooling zone of the extruder where additional dilution water was added to form the aqueous dispersions having solid level contents in the range of from less than 70 weight percent. The initial aqueous stream, and the dilution water were all supplied by Isco dual syringe pumps (from Teledyne Isco, Inc. (Lincoln, Nebr., USA). The barrel temperature of the extruder was set to 150° C. After the dispersion exited the extruder, it was further cooled and filtered via a 200 μm mesh size bag filter. Particle size analysis was done with the Beckman Coulter LS 13320 Laser Light Scattering Particle Sizer (Beckman Coulter Inc., Fullerton, Calif.) using the standard procedure. Volume average particle size was obtained.

TABLE 1

| Polyolefin Dispersions | | | | |
|---|---|---|---|---|
| | ENGAGE™ 8200 | LICOCENE PE MA 4351 | Lauryl ether (2EO) sulfate | Mean particle size (nm) |
| Dispersion 1 | 80 parts by weight | 16 parts by weight | 4 parts by weight | 300 |
| Dispersion 2 | 88 parts by weight | 10 parts by weight | 2 parts by weight | 987 |

Polyolefin/(meth)acrylic composite polymer was produced using emulsion polymerization using the aqueous polyolefin dispersion as a seed to produce an inventive composite polymer composition according to the following procedure.

All polymerizations were conducted by charging into a round bottom flask reactor the indicated amount as solids of the polyolefin dispersion in Table 1 and purging with nitrogen gas while maintaining at 65° C. Catalyst solution was added into the reactor while stirring. The indicated monomers were premixed and a monomer emulsion was prepared in the proportions indicated in Table 2 and injected into the reactor over 60 minutes. At the same time, a redox catalyst pair was fed into the reactor as a free radical initiator over 90 minutes. The reaction was maintained at 60° C. for 90 min and then allowed to cool to 25° C. and filtered through a 190 μm filter. The product composite polymer comprised polyolefin to acrylic ratio of 100:15.

TABLE 2

| | Seeded Emulsion Polymerization Composition |
|---|---|
| Reactor Charge | Deionized water (DI water) 811.35 g |
| | Polyolefin dispersion 2 in Table 1(50.8 wt. % solid) 2700 g |
| Catalyst (shot) | $FeSO_4$ 0.135 g |
| | Deionized water 5.4 g |
| Monomer Emulsion: | DI water: 49.5 g |
| | Dodecyl sodium sulfonate 1.88 g |
| | Ethylhexyl methacrylate 12.33 g |
| | Methylmethacrylate 190.35 g |
| | 3-(Trimethoxysilyl)propyl methacrylate 1.03 g |
| | Ethylene glycol dimethacrylate 2.06 g |
| Initiators (cofeed) | t-Butyl peroxide (70% active) 0.99 g dissolved in 27 g deionized water |
| | Sodium formaldehyde sulfoxylate 0.69 g dissolved in 27 g deionized water |

It will be understood that by changing the ratio of (meth)acrylic monomers to olefin, polyolefin particles with PMMA based acrylic component (10-40 wt % relative to the polyolefin) can be obtained.

The inventive composite polymer composition was spray dried according to the following procedure. A two-fluid nozzle atomizer was equipped on a Mobile Minor spray dryer (GEA Process Engineering Inc. (Copenhagen, Denmark)). The nitrogen pressure to nozzle was fixed at 1 bar with 50% flow which is equivalent to 6.0 kg/hour of air flow. A glass jar was placed under the cyclone with the valve on the bottom of the cyclone open. Olefin-acrylic dispersion (~40 wt % solid) was pumped into the heated chamber by an emulsion feed pump. The spray drying experiment was conducted in $N_2$ environment with an inlet temperature fixed at 120° C., and the outlet temperature was controlled at 40° C. by tuning the feed rate of the dispersion. Meanwhile, the hydrophobic surface modified $CaCO_3$ (WINNOFIL® S, from Solvay Chemicals (Brussels, Belgium)) was fed into the chamber as an anti-caking agent. The mean particle size of the dry powder was measured to be in the range of 20-40 µm.

The inventive impact modifier (olefin:acrylic=100:15, acrylic phase 94.5% MMA/4% Ethylhexyl methacrylate/1.5% ethylene glycol dimethacrylate and 0.5 wt % trimethylsilymethacrylate was used as an impact modifier in polycarbonate (LEXAN 141R, commercially obtained from SABIC Americas, Inc. (Houston, Tex.), melt index 12 g/min). Table 3 provides physical property data for varying loadings of the inventive impact modifier in polycarbonate. Polycarbonate (PC) was the LEXAN 141R. Comparative Examples were produced using PARALOID EXL-2300, an all-acrylic core/shell impact modifier based on butyl-acrylate rubber and PARALOID EXL-2691A, an MBS (methacrylate-butadiene-styrene) impact modifier. PARALOID impact modifiers are commercially available from The Dow Chemical Company (Midland, Mich.).

Compounding Procedure

The grafted polyolefin core-shell was used as impact modifier in polycarbonate (Lexan 141R). It was compared with an acrylic impact modifier (PARALOID EXL 2300) and with a MBS impact modifier (PARALOID EXL 2691A). For comparative purposes, the ungrafted polyolefin particles as well as pellets of the ethylene-octene copolymers were melt blended with the polycarbonate resin. Before compounding, the Polycarbonate resin was thoroughly dried 4 hours at 110° C. in a low pressure dryer.

The resin and the impact modifiers (at 3 and 5% addition level) were compounded with Werner and Pfleiderer ZSK 30 co-rotating twin screw extruder (L/D=26).

The resin and the modifiers were supplied to the feed throat of the extruder via the gravimetric K-Tron feeders and then melt blended. The extruded strand was then cooled and pelletized with a granulometer (Sheer & Cie-Stuttgart 30).

The temperature profile of the extruder was set as 260-270-280-285-290° C. (from the hopper to the die) and the compounding was done with a screw speed of 150 RPM and an output of 10 Kg/hr.

Injection Molding Procedure

The compounded pellets were dried 4 hours at 110° C. in a low pressure dryer and injection molded utilizing the Battenfield HM80/120 machine with the following temperature profile: 280-280-285-290° C. (from the hopper to the die). The holding pressure was set as 200 bars and the mould temperature was 80° C. The molds were ejected after a cooling time of 40 secs.

TABLE 3

| Example | Matrix + Impact Modifier | Izod Impact (J/m) 23° C. | Izod Impact (J/m) −30° C. | % of Izod impact retained | MVI (1.2 Kg @ 300° C. |
|---|---|---|---|---|---|
| LEXAN 141R control | LEXAN + no impact modifier | 642 | 155 | 24 | 12.0 |
| Comparative Example 1 | LEXAN + 5% Paraloid EXL 2300 | 552 | 405 | 73 | 11.4 |
| Comparative Example 2 | LEXAN + 5% Paraloid EXL 2691A | 539 | 438 | 81 | 9.5 |
| Inventive Example 1 | LEXAN + 5% polyolefin/(meth)acrylic composite polymer | 551 | 382 | 69 | 12.8 |
| Comparative example 3 | LEXAN + 5% ENGAGE 8200 pellets | 558 | 270 | 48 | 12.4 |
| Comparative example 4 | LEXAN + 5% polyolefin powder blended with (meth)acrylic component(but not a composite polyolefin/(meth)acrylic polymer) | 561 | 289 | 51 | 13.0 |

As can be seen from Table 3, the inventive composite polymer impact modifier composition helps LEXAN 141R (available from SABIC Americas Inc.) retain more of the impact than the comparative examples 3 or 4, where the polyolefin is added as pellets and blending is achieved in the extruder, whilst in comparative example 4, the polyolefin is prepared without a shell and then added to the LEXAN. The retention of impact in the last two cases are lower when compared with the commercial additives (comparative examples 1 and 2) and the inventive example 1.

Table 4 below illustrates the effect of weathering on Izod Impact of the Inventive Example 1 and Comparative Examples 1 and 2. The accelerated weathering was conducted using an Atlas Xenon CI-65 weatherometer. The samples are exposed to constant environmental extremes such that weathering takes place at an accelerated rate thereby allowing observation of the effects of many years of natural exposure in a very short time. The overall result is that product weatherability can be determined quickly. As can be seen in Table 4, the acrylic based PARALOID EXL 2300 as well as the inventive impact modifiers provide good retention of Izod impact.

TABLE 4

| Example | Izod Impact Before Exposure testing (ft · lbf/in) | Standard deviation (ft · lbf/in) | After 500 hours of exposure (ft · lbf/in) | Standard deviation (ft · lbf/in) |
| --- | --- | --- | --- | --- |
| LEXAN 141R control | 15.2 | 0.22 | 15.04 | 0.1 |
| Inventive Example 1: LEXAN 141R + 5% polyoefin/(meth)acrylic composite polymer | 14.92 | 0.55 | 14.13 | 0.3 |
| Comparative Example 1: LEXAN 141R + 5% PARALOID EXL 2300 | 14.72 | 0.32 | 13.44 | 0.4 |
| Comparative Example 2: LEXAN 141R + 5% PARALOID EXL 2691A | 13.58 | 0.7 | 12.11 | 0.28 |

MVI Description

The compounded pellets were dried for 4 hours at 110° C. in a low pressure dryer. The melt viscosity index (MVI) was measured using the Kayeness Dynisco 4000 melt indexer. A small amount of the compound (about 5-6 grams) was introduced in the feed and was heated to 300° C. Then, a piston was inserted with 1.2 kg weight in order to exert a force on the molten compound, which is extruded through a die (diameter: 2 mm). The MVI is expressed in cc/10 min.

Figure 1:
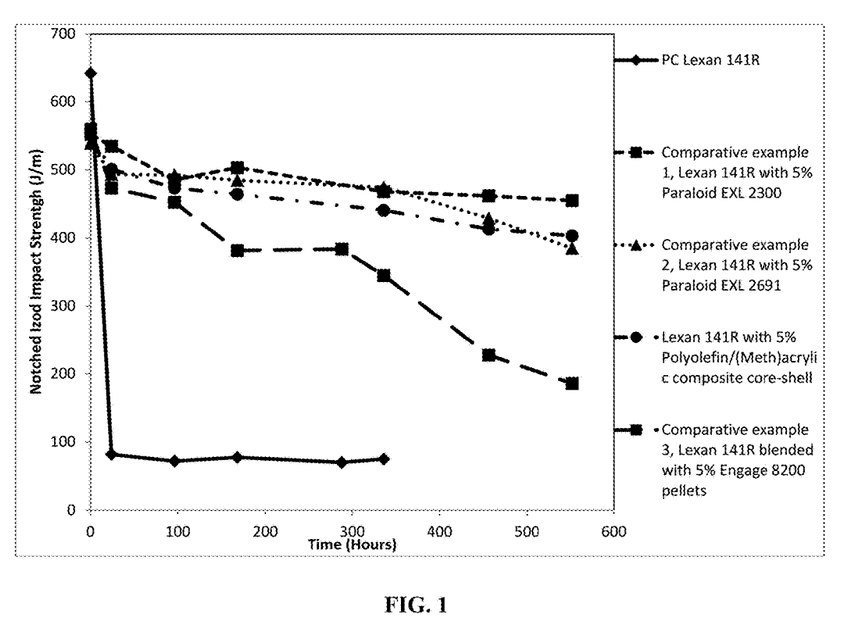
FIG. 1 is a graph illustrating the retention of Notched Izod Impact Strength (measured on 3.2 mm injection moulded specimens) after thermal exposure at 120° C. as a function of time for compositions with 5 wt % impact modifier.
Figure 2:
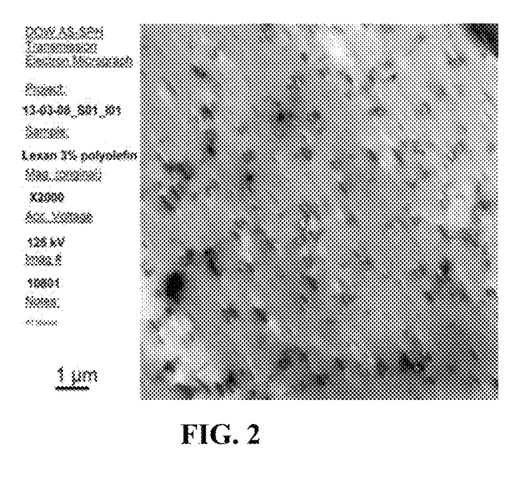
FIG. 2 is a TEM image of LEXAN 141R with an impact modifier according to the present invention.
Figure 3:
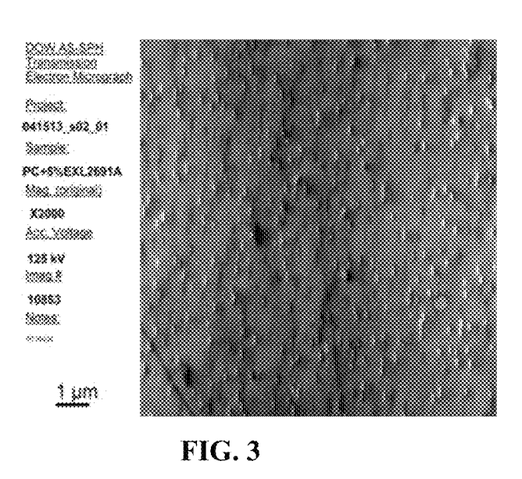
FIG. 3 is a TEM image of LEXAN 141R with an impact modifier commercially available from The Dow Chemical Company under the name PARALOID EXL 2691A.

As can be readily seen from FIG. 1, the inventive examples, including low levels of the polyolefin/(meth) acrylic impact modifier show improved impact resistance in comparison to unmodified polycarbonate with aging; the divergent values of the blend of LEXAN 141R with ENGAGE 8200, with time, can also be noticed.

Test Methods

Test methods include the following:

Density of ethylene-based polymers was measured according to ISO 1183.

Density of propylene-based polymers was measured according to ASTM D792.

MVI was measured according to ISO 1133.

Notched Izod Impact Strength measured according to ASTM D256

Oven aging: Pre-notch injection moulding specimens are placed into a ventilated oven, with a set temperature of 120° C. Izod bars are mounted in a fashion allowing no contacts with other bars or oven surface. Samples are taken out at regular intervals, and impact strength is measured at room temperature.

Transmission Electron Microscopy (TEM) Analysis

Izod bars were used for the TEM analysis. The samples were roughly trimmed with a scalpel and clamped into a microtome chuck. The clamp was mounted into an ultra microtome. The film was then trimmed to a block-face measuring less than 1 mm by 1 mm using a Diatome CryoTrim tool. Sections were cut using conditions seen in Table 5. Suitable sections were collected onto a standard Formvar TEM grid with an eyelash and the grid was placed in a grid holder. Sections on a standard carbon coated TEM grid were stained. Table 5 shows the timing and stain used. The grid was then transferred into a Hitachi 7000 TEM and the sample was examined. Images were recorded with a Gatan Ultrascan 1000 4 megapixel camera.

TABLE 5

| Microtomy | Condition | Imaging | Condition |
| --- | --- | --- | --- |
| Stain | RuO$_4$ | TEM | Hitachi H-7000 |
| Staining Time | 40 minutes | Source | Tungsten |
| Microtome | Leica EMUC7 | Accelerating Voltage | 125 kV |
| Knives | Cryo-Trim and Cryo-45° | Magnifications | 4,000x |
| Sectioning Temperature | −40° C. | Method | Sections on a grid |
| Sectioning Speed | 0.8 mm/sec | Imaging Temperature | Room Temperature (about 25° C.) |
| Section Thickness | 100 nm | Not applicable | Not applicable |

The present invention may be embodied in other forms without departing from the spirit and the essential attributes thereof, and, accordingly, reference should be made to the appended claims, rather than to the foregoing specification, as indicating the scope of the invention.

We claim:
1. A composite polymer composition comprising:
    an emulsion polymerization product of:
        (i) an aqueous polyolefin dispersion comprising the melt kneading product of one or more polyolefins, from 2 to 25% of one or more dispersion stabilizing agents, water and optionally a neutralizing agent, and
        (ii) one or more (meth)acrylic monomers;
    wherein the one or more polyolefins have a Tg equal to or less than 50° C.; and wherein the melt kneading product

(i) comprises polymer particles having a volume average particle size between 150 nm and 2000 nm dispersed in the water; and wherein the one or more (meth)acrylic monomers polymerize onto the polymer particles to form composite polymer particles; and wherein the (meth)acrylic shell is partially crosslinked and has a Tg less than 50° C.

2. The composite polymer composition according to claim 1, wherein the ratio of the-one or more polyolefins-to the in the composite polymer particles is between 60:40 and 95:5.

3. The composite polymer composition according to claim 1, wherein the one or more polyolefins are selected from the group consisting of ethylene homopolymers, ethylene/α-olefin copolymers, ethylene/α-olefin multiblock interpolymers, propylene homopolymers, propylene/α-olefin copolymers and propylene/α-olefin multiblock interpolymers.

4. The composite polymer composition according to claim 1, wherein the one or more (meth)acrylic monomers are selected from the group consisting of functionalized (meth)acrylic monomers.

5. The composite polymer composition according to claim 1, wherein the composite polymer particles have a core/shell or core/partial shell structure.

6. An impact modifier composition comprising a spray dried product of the composite polymer composition according to claim 1.

7. An impact modified resin comprising:
a matrix polymer resin; and
the impact modifier composition according to claim 6.

8. The impact modified resin according to claim 7, wherein the matrix polymer resin is selected from the group consisting of polycarbonate (PC) and PC blends, polyesters, polystyrene (PS), styrenic copolymers, polyvinylchloride (PVC), polyamides (PA) and acetal resins.

9. A method for forming an impact modifier composition comprising:
melt kneading one or more polyolefins, less than or equal to one or more dispersion stabilizing agents, water and optionally a neutralizing agent to form a melt kneading product, wherein the one or more polyolefins have a Tg of equal to or less than 50° C.;
adding to the melt kneading product one or more (meth) acrylic monomers under emulsion polymerization conditions to form a composite polymer composition; and
isolating the composite polymer particles by removing water from the emulsion,
wherein the isolating is selected from the group consisting of spray drying and fluid bed drying.

* * * * *

UNITED STATES PATENT AND TRADEMARK OFFICE
CERTIFICATE OF CORRECTION

PATENT NO. : 10,131,775 B2
APPLICATION NO. : 14/902580
DATED : November 20, 2018
INVENTOR(S) : Liang Chen et al.

It is certified that error appears in the above-identified patent and that said Letters Patent is hereby corrected as shown below:

In the Claims

Column 17, Line 11, insert the word --poly(meth)acrylic-- after the words "polyolefins to the" and before the words "in the composite polymers".

Signed and Sealed this
Fourteenth Day of May, 2019

Andrei Iancu
*Director of the United States Patent and Trademark Office*